(12) United States Patent
Park et al.

(10) Patent No.: US 10,581,704 B2
(45) Date of Patent: Mar. 3, 2020

(54) CLOUD SYSTEM FOR SUPPORTING BIG DATA PROCESS AND OPERATION METHOD THEREOF

(71) Applicant: ELECTRONICS AND TELECOMMUNICATIONS RESEARCH INSTITUTE, Daejeon (KR)

(72) Inventors: Dae Heon Park, Daejeon (KR); Se Han Kim, Daejeon (KR); Hyeon Park, Daejeon (KR); Jee Sook Eun, Daejeon (KR); Eun Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 15/810,729

(22) Filed: Nov. 13, 2017

(65) Prior Publication Data
US 2018/0212843 A1 Jul. 26, 2018

(30) Foreign Application Priority Data

Jan. 23, 2017 (KR) .................. 10-2017-0010671

(51) Int. Cl.
*H04L 12/24* (2006.01)
*H04L 12/26* (2006.01)
*G06F 9/48* (2006.01)
*G06F 9/50* (2006.01)
*H04L 29/08* (2006.01)

(52) U.S. Cl.
CPC ........ *H04L 41/5054* (2013.01); *G06F 9/4881* (2013.01); *G06F 9/5077* (2013.01); *H04L 41/0843* (2013.01); *H04L 41/5048* (2013.01); *H04L 43/0817* (2013.01); *H04L 43/0876* (2013.01); *H04L 43/16* (2013.01); *H04L 41/0893* (2013.01); *H04L 67/10* (2013.01)

(58) Field of Classification Search
CPC .................................................... H04L 41/5054
USPC .......................................................... 709/223
See application file for complete search history.

(56) References Cited

U.S. PATENT DOCUMENTS

| 9,009,713 B2 | 4/2015 | Lee et al. |
| 2015/0026517 A1* | 1/2015 | Ben Romdhane .. G06F 11/1458 714/15 |
| 2016/0203024 A1 | 7/2016 | Choi et al. |
| 2016/0323377 A1* | 11/2016 | Einkauf ............. H04L 67/1076 |

FOREIGN PATENT DOCUMENTS

| KR | 1020140086436 A | 7/2014 |
| KR | 101656360 B1 | 9/2016 |

* cited by examiner

*Primary Examiner* — David R Lazaro
*Assistant Examiner* — Zia Khurshid
(74) *Attorney, Agent, or Firm* — LRK Patent Law Firm (57) ABSTRACT

A cloud system for a big data process, and an operation method thereof. A cloud operation method of processing big data includes: receiving a cluster rule; monitoring a cluster resource and a cluster task; adding a cluster resource based on the cluster rule and a cluster resource monitoring value; and replicating a cluster based on a cluster rule and a cluster task monitoring value, wherein the cluster rule may include at least one of a resource assignment threshold value, a resource amount to be assigned, a task threshold value, and a number of replicated clusters.

16 Claims, 9 Drawing Sheets

CLOUD SYSTEM FOR SUPPORTING BIG DATA PROCESS AND OPERATION METHOD THEREOF

CROSS REFERENCE TO RELATED APPLICATION

The present application claims priority to Korean Patent Application No. 10-2017-0010671, filed Jan. 23, 2017, the entire content of which is incorporated herein for all purposes by this reference.

BACKGROUND OF THE INVENTION

1. Field of the Invention

The present disclosure relates to a cloud system for supporting a big data process, and an operation method thereof. More particularly, the present invention relates to a cloud system for continuously maintaining big data processing performance, and an operation method thereof.

2. Description of Related Art

The term "cloud" refers to a computing technology based on the Internet wherein a user can use web-based software services while a program therefor is executed in a utility data server accessed via the Internet.

Cloud services are generally classified as an IaaS (Infrastructure as a Service), a PaaS (Platform as a Service), and a SaaS (Software as a Service).

IaaS provides an infrastructure in the cloud means services proving a resource such as a server to a user. Amazon web services (AWS) is a representative example IaaS.

PaaS means a technology in which a user is a developer, and environments for developing software are provided. An APP engine of Google is a representative example of PaaS.

SaaS mean a technology of providing web-based application services, and N-drive of Naver, Dropbox, etc. are representative examples of SaaS.

Meanwhile, a cloud system may generate a virtual machine (VM) by dividing a physical computing resource. A big data system may be implemented and operated in a guest OS of the virtual machine of the cloud system. Accordingly, the big data system may be operated based on a resource (CPU, memory, disk, network, etc.) assigned by the cloud system.

In order to provide cloud services, a hypervisor that helps to install a virtual OS in a physical server and a cloud management system that helps a cloud environment management while interchanging information of a virtual machine resource may be required. As a cloud resource management system, a cloud stack and an open stack are provided.

Recently, a Hadoop that is widely used for a data analysis system is configured with a HDFS (Hadoop distributed file system) and a MapReduce.

A MapReduce processes data in two steps. A map modifies data by reading an input file in lines, a reduce collects result data of the map. Herein, a data modification rule of the map may be freely defined by a user.

A Hadoop builds and operates a cluster to analyze data, and a YARN (yet another resource negotiator) is used for monitoring and analyzing a Hadoop cluster resource to smoothly use a computing resource.

In a convention cloud resource management system, load-balancing, auto-scaling, and high availability (HA) are provided. Services in a cloud resource management system are functions for web-based services, thus it is not proper for other service as a big data.

The foregoing is intended merely to aid in the understanding of the background of the present invention, and is not intended to mean that the present invention falls within the purview of the related art that is already known to those skilled in the art.

SUMMARY OF THE INVENTION

An object of the present disclosure is to provide a cloud system capable of adding a Hadoop cluster resource based on a Hadoop cluster rule, and an operation method thereof.

Another object of the present disclosure is to provide a cloud system capable of replicating a Hadoop cluster based on a Hadoop cluster rule, and an operation method thereof.

Still another object of the present disclosure is to provide a cloud system capable of returning an added Hadoop cluster resource or a replicated Hadoop cluster based on a Hadoop cluster rule, and an operation method thereof.

Technical problems obtainable from the present disclosure are non-limited by the above-mentioned technical problems, and other unmentioned technical problems may be clearly understood from the following description by those having ordinary skill in the technical field to which the present disclosure pertains.

According to one aspect of the present disclosure, there is provided a cloud operating method. The cloud operating method includes: receiving a cluster rule; monitoring a cluster resource and a cluster task; adding a cluster resource based on the cluster rule and a cluster resource monitoring value; and replicating a cluster based on the cluster rule and a cluster task monitoring value; wherein the cluster rule may include at least one of a resource assignment threshold value, a resource amount to be assigned, a task threshold value, and a number of clusters to be replicated.

Herein, in the receiving of the cluster rule, a pre-stored cluster rule may be received from at least one of an external storage device and an internal storage device, or the cluster rule may be received through an input device.

Meanwhile, in the adding of the cluster resource, as many cluster resources as the resource amount to be assigned may be added when the cluster task monitoring value is equal to or greater than the resource assignment threshold value.

Meanwhile, the replicating of the cluster may include: determining a cluster replication when the cluster task monitoring value is equal to or greater than the task threshold value; replicating a template of the cluster; additionally assigning a cluster resource; replicating the cluster equal to the number of clusters to be replicated based on the template of the cluster and the additionally assigned resource; and dividing a task of the cluster and distributing the divided task to the replicated cluster.

Meanwhile, the cloud operating method may further include: returning the added cluster resource based on the cluster rule and the cluster resource monitoring value.

Herein, the cluster rule may further include a resource returning threshold value, and in the returning of the added cluster resource, the added cluster resource may be returned when the cluster task monitoring value is equal to or smaller than the resource returning threshold value.

Meanwhile, the cloud operating method may further include: returning the replicated cluster based on the cluster rule and the cluster task monitoring value.

Herein, the cluster rule may include a task returning threshold value, and the returning of the replicated cluster may include: determining a return of the replicated cluster when the cluster task monitoring value is smaller than the task returning threshold value; updating data of the replicated cluster to an original cluster; and returning a resource of the replicated cluster.

Meanwhile, the cluster may be a Hadoop cluster of an IaaS (Infrastructure as a Service) cloud system.

According to another aspect of the present disclosure, there is provided a cloud system. The cloud system includes: a big data rule management module receiving and storing a cluster rule; an instance management module generating a cluster; a resource management module monitoring a cluster resource; a cluster task management module monitoring a cluster task; and a cluster configuration management module sending a request for an additional cluster resource to the resource management module based on the cluster rule and a cluster resource monitoring value, and sending a request for a cluster replication to the instance management module based on the cluster rule and a cluster task monitoring value, wherein the cluster rule may include at least one of a resource assignment threshold value, a resource amount to be assigned, a task threshold value, and a number of clusters to be replicated.

Herein, the big data rule management module may receive a pre-stored cluster rule from at least one of an external storage device and an internal storage device, or may receive the cluster rule through an input device.

Meanwhile, the cluster configuration management module may determine to add as many resources as the resource amount to be assigned when a cluster task monitoring value is equal to or greater than the resource assignment threshold value.

Meanwhile, the cloud system may further include: a template management module replicating a template of the cluster, wherein the cluster configuration management module may determine a cluster replication when the cluster task monitoring value is equal to or greater than the task threshold value, the instance management module may send a request for a template replication of the cluster to the template management module according to the cluster replication decision of the cluster configuration management module, send a request for an additional resource assignment to the resource management module, and replicate the cluster equal to a number of clusters to be replicated based on the additionally assigned resource and the replicated template of the cluster, and the cluster task management module may divide a task of the cluster and distribute the divided task to the replicated cluster.

Meanwhile, the cluster configuration management module may determine a return of the added cluster resource based on the cluster rule and the cluster resource monitoring value.

Meanwhile, the cluster rule may further include a resource returning threshold value, and the cluster configuration management module may determine the return of the added cluster resource when the cluster resource monitoring value is smaller than the resource returning threshold value.

Meanwhile, the cluster configuration management module may determine a return of the replicated cluster based on the cluster rule and the cluster task monitoring value.

Herein, the cluster rule may further include a task returning threshold value, and the cluster configuration management module may determine the return of the replicated cluster when the cluster task monitoring value is equal to or smaller than the task returning threshold value, wherein the cloud system may further include: a cluster update management module updating data of the replicated cluster to an original cluster according to the replicated cluster returning decision of the cluster configuration management module, and the resource management module may return the resource of the replicated cluster according to the replicated cluster returning decision of the cluster configuration management module.

Meanwhile, the cluster may be a Hadoop cluster of an IaaS (Infrastructure as a Service) cloud system.

According to the present disclosure, in a cloud system for a big data process, a big data processing speed is maintained by adding a cluster resource or replicating a cluster, thus high availability may be easily provided.

In addition, according to the present disclosure, a big data processing may be continuously provided when an error occurs in an original big data system by replicating a cluster.

Meanwhile, according to the present disclosure, a big data system may be continuously used regardless of a version change thereof since the big data system is operated by using a cloud system without changing functions of the big data system.

It will be appreciated by persons skilled in the art that that the effects that could be achieved with the present disclosure are not limited to what has been particularly described hereinabove and other advantages of the present disclosure will be more clearly understood from the following detailed description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, with reference to drawings, embodiments of the present disclosure are described in detail in a manner that one of ordinary skill in the art may perform the embodiments without undue difficulty. However, as those skilled in the art would realize, the described embodiments may be modified in various different ways, all without departing from the spirit or scope of the present disclosure.

To avoid obscuring the subject matter of the present disclosure, while embodiments of the present disclosure are illustrated, well known functions or configurations will be omitted from the following descriptions. The drawings and description are to be regarded as illustrative in nature and not restrictive. Like reference numerals designate like elements throughout the specification.

In the present disclosure, when an element is mentioned to be "coupled" or "connected" to another element, this may mean that it is directly coupled or connected to the other element, but it is to be understood that yet another element may exist in-between. In addition, it will be understood that the terms "comprises", "comprising", "includes", "including" when used in this specification, specify the presence of one or more other components, but do not preclude the presence or addition of one or more other components unless defined to the contrary.

In the present disclosure, the terms first, second, etc. are used only for the purpose of distinguishing one element from another, and do not limit the order or importance, etc., between elements unless specifically mentioned. Therefore, within the scope of the present disclosure, a first component of an embodiment may be referred to as a second component in another embodiment, or similarly, a second component may be referred to as a first component.

In the present disclosure, the components that are distinguished from each other are intended to clearly illustrate each feature and do not necessarily mean that components are separate. In other words, a plurality of components may be integrated into one hardware or software unit or one component may be distributed into a plurality of hardware or software units. Thus, unless otherwise noted, such integrated or distributed embodiments are also included within the scope of the present disclosure.

In the present disclosure, the components described in the various embodiments are not necessarily essential components, and some may be optional components. Thus, embodiments including a subset of the components described in one embodiment are also included within the scope of this disclosure. Also, embodiments that include other elements in addition to those described in the various embodiments are also included within the scope of the present disclosure.

A cloud system according to the present invention is described with an assumption that the cloud system is an IaaS type cloud system for supporting a big data process. However, it is not limited thereto, the cloud system according to the present invention may be applied to cloud systems of various types.

Hereinafter, with reference to drawings, embodiments of the present disclosure are described.

Figure 1:
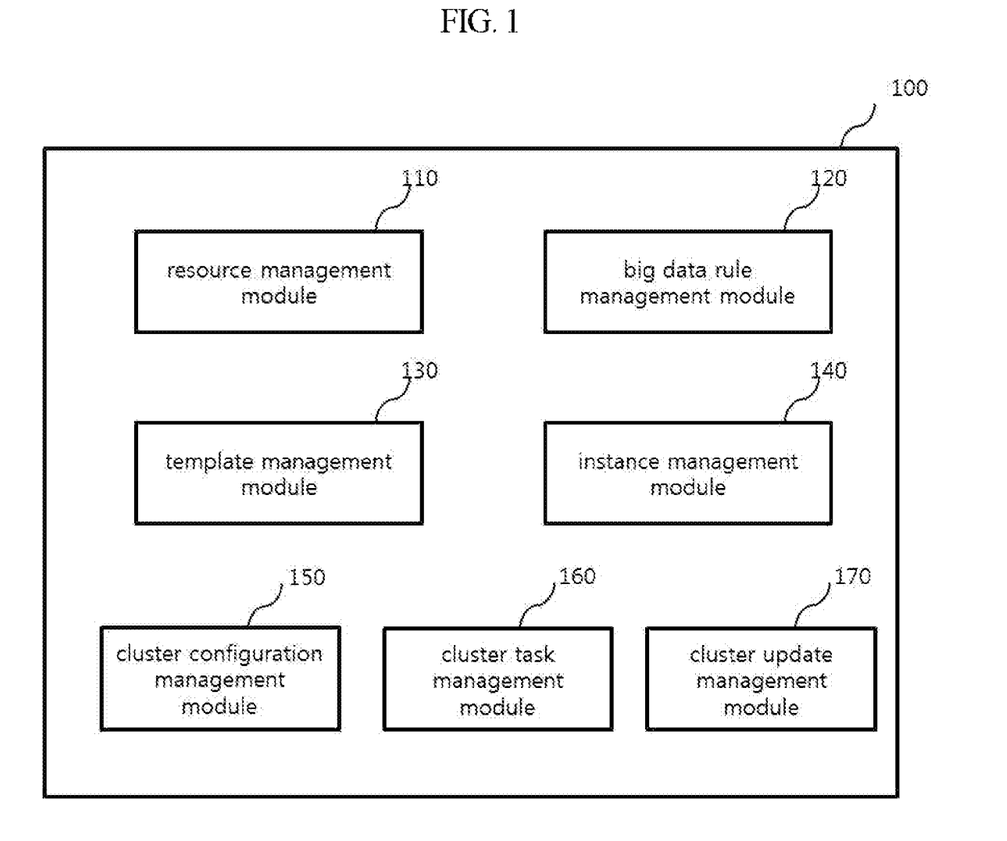
FIG. 1 is a block diagram of a cloud system for supporting a big data process according to an embodiment of the present disclosure.

FIG. 1 is a block diagram of a cloud system for supporting a big data process according to an embodiment of the present disclosure.

Referring to FIG. 1, a cloud system 100 includes a resource management module 110, a big data rule management module 120, a template management module 130, an instance management module 140, a cluster configuration management module 150, a cluster task management module 160, and a cluster update management module 170.

The resource management module 110 may be a module managing a resource of a physical server of the cloud system, and configured with a network manager managing a network, a disk manager managing a disk, a memory manager managing a memory, and a CPU manager managing a CPU.

Meanwhile, the resource management module 110 may monitor a cluster resource.

In addition, the resource management module 110 may transmit a monitoring value of the cluster resource to the cluster configuration management module 150 according to a request of the cluster configuration management module 150.

In addition, the resource management module 110 may additionally assign a resource to an existing cluster according to a request of the cluster configuration management module 150.

In addition, the resource management module 110 may assign a resource to a newly generated cluster or replicated cluster according to a request of the instance management module 140.

Meanwhile, the resource management module 110 may return an additionally assigned resource or a resource for replicating a cluster according to a return decision of the cluster configuration management module 150.

The big data rule management module 120 receives and stores a cluster rule. Herein, the cluster rule means a criterion how to operate big data in the cloud system.

The cluster rule according to an embodiment of the present invention may include at least one of a resource assignment threshold value, a resource amount to be assigned, a task threshold value, a number of clusters to be replicated, a resource returning threshold value, and a task returning threshold.

Meanwhile, the big data rule management module 120 may receive a pre-stored cluster rule from at least one of an external storage device or an internal storage device, or may directly receive the cluster rule from a user through an input device.

The template management module 130 manages a template of the big data system stored in the cloud system. The template management module 130 may store an operating system (OS) that is previously generated, and environment setting thereof when generating an instance (or virtual machine, VM).

In addition, the template management module 130 may replicate and store a template of an operating big data system. In addition, the template management module 130 may provide the replicated template to the instance management module 140.

Meanwhile, the template management module 130 may replicate a template of a currently operating cluster according to a template replication request of the instance management module 140.

The instance management module 140 is a module generating a virtual machine, and managing a state of an instance.

The instance management module 140 may generate a cluster. In detail, the instance management module 140 may send a request for a resource assignment to the resource management module 110, and send a request for a template generation to the template management module 130 according to a cluster generation request of the cluster configuration management module 150. In addition, the instance management module 140 may generate a cluster based on the template generated in the assigned resource.

In addition, the instance management module 140 may replicate a cluster. In detail, the instance management module 140 may send a request for an additional resource assignment to the resource management module 110, and send a request for a template replication of a currently operating cluster to the template management module 130 according to a cluster replication decision of the cluster configuration management module 150. In addition, the instance management module 140 may replicate a cluster based on the template of the cluster replicated in the additionally assigned resource.

The cluster configuration management module 150 is a module operating and managing a cluster according to a cluster rule. The cluster configuration management module 150 may determine operations such as a cluster generation, a cluster replication, a cluster resource addition, a return of a replicated cluster, and a return of an added cluster resource, etc. In addition, the cluster configuration management module 150 may send a send a request for performing each operation described above to each module of the cloud system 100.

In detail, the cluster configuration management module 150 may send a request for a cluster generation to the instance management module 140 according to a cluster generation request of a user. A detailed example of generating a cluster will be described in detail later with reference to FIG. 3.

The cluster configuration management module 150 may send a request for a cluster replication to the instance management module 140 based on a cluster rule and a cluster task monitoring value monitored in the cluster task management module 160. Herein, the cluster configuration management module 150 may determine to add as many resources as a resource amount to be assigned of a cluster rule when a cluster task monitoring value is equal to or greater than a resource assignment threshold value of the cluster rule.

In addition, the cluster configuration management module 150 may send a request for an additional cluster resource to the resource management module 110 based on a cluster rule and a cluster resource monitoring value monitored in the resource management module 110. Herein, the cluster configuration management module 150 may determine a cluster replication when a cluster task monitoring value is equal to or greater than a task threshold value of the cluster rule.

A detailed example of adding a cluster resource and a cluster replication will be described later in detail with reference to FIG. 4.

Meanwhile, the cluster configuration management module 150 may determine a return of an added cluster resource based on a cluster rule and a cluster resource monitoring value. Herein, the cluster configuration management module 150 may determine the return of the added cluster resource when the cluster resource monitoring value is smaller than a return threshold value of the cluster rule.

In addition, the cluster configuration management module 150 may determine a return of a replicated cluster based on a cluster rule and a cluster task monitoring value. Herein, the cluster configuration management module 150 may determine the return of the replicated cluster when the cluster task monitoring value is smaller than a task returning threshold value of the cluster rule.

A detailed example of returning an added cluster resource and a replicated cluster will be described in detail later with reference to FIG. 5.

The cluster task management module 160 may monitor a task that is operated in a cluster. In addition, the cluster task management module 160 may divide the task and distribute the divided task to a replicated cluster when replicating the cluster.

The cluster update management module 170 may update cluster data to another cluster. In detail, the cluster update management module 170 may update data of a replicated cluster to an original cluster when returning the replicated cluster.

In the cloud system 100 of FIG. 1, all of the plurality of configurations respectively described above may be included to support a big data process, or a part of the plurality of configurations respectively described above may be omitted or an operation order thereof may be changed. In addition, an additional configuration that is not described in the present disclosure may be additionally configured.

Figure 2:
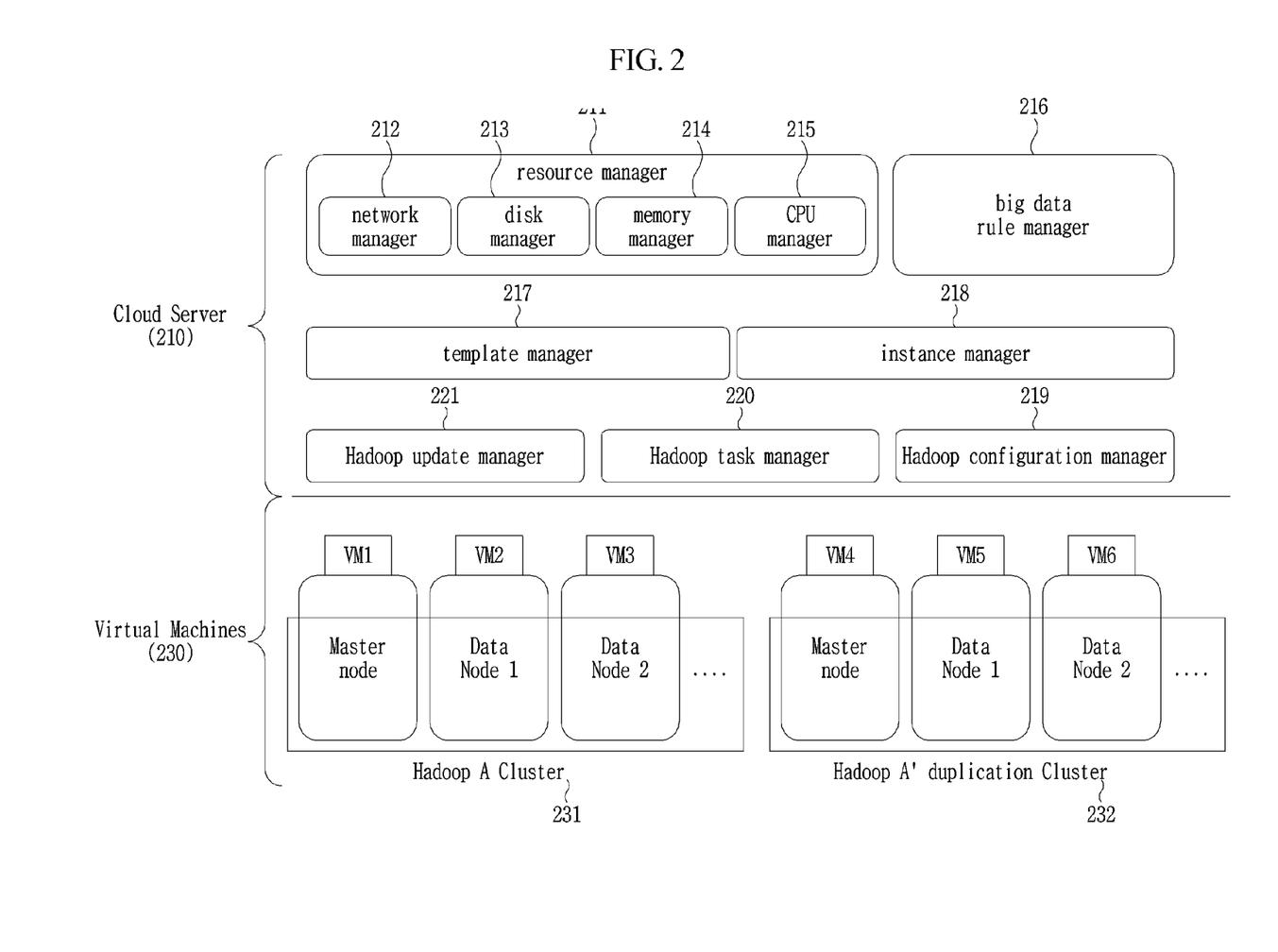
FIG. 2 is a block diagram of a cloud server for supporting a process of big data according to an embodiment of the present disclosure.

The cloud system 100 of FIG. 1 as described above may be implemented as a cloud server 210 of FIG. 2.

The cloud server 210 of FIG. 2 may generate a virtual machine 230 by dividing a physical computing resource. A big data system may be operated by being built in a Hadoop A cluster 231 of the virtual machine 230. Herein, a Hadoop A' duplication cluster 232 may be a replicated cluster described in FIG. 1.

Meanwhile, the resource management module 110, the big data rule management module 120, the template management module 130, the instance management module 140, the cluster configuration management module 150, the cluster task management module 160, and the cluster update management module 170 of FIG. 1 may be respectively correspond to a resource manager 211, a big data rule manager 216, a template manager 217, an instance manager 218, a Hadoop configuration manager 219, a Hadoop task manager 220, and a Hadoop update manager 221 of FIG. 2.

Meanwhile, the resource manager 211 may include a network manager 212, a disk manager 213, a memory manager 214, and a CPU manager 215, and effectively manage a resource of a network, a disk, a memory, a CPU, etc.

Figure 3:
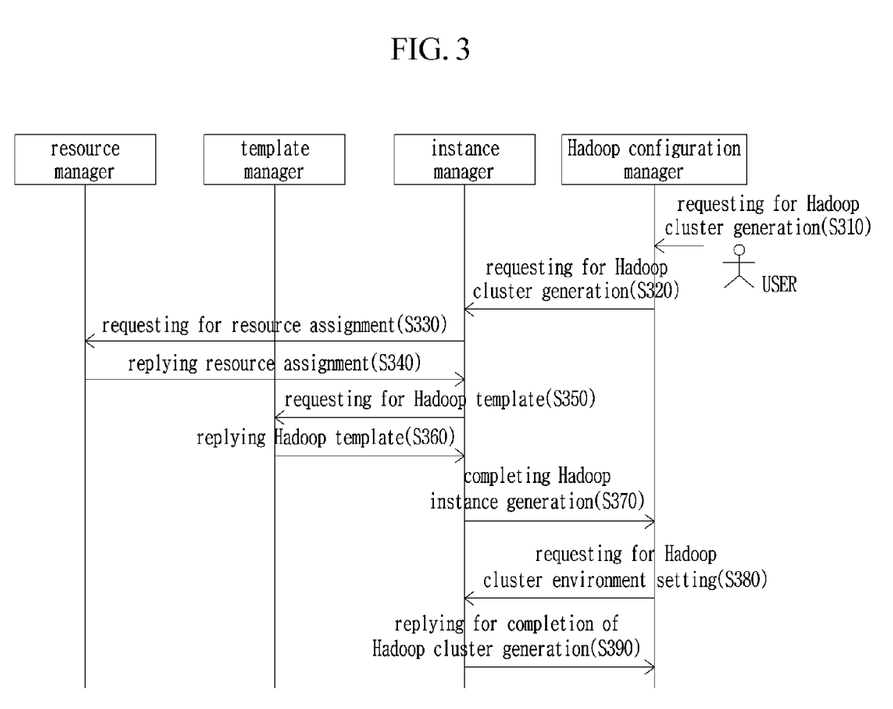
FIG. 3 is a view showing a generation process of a Hadoop cluster within the cloud system according to the embodiment of the present disclosure.

FIG. 3 is a view showing a generation process of a Hadoop cluster within the cloud system according to the embodiment of the present disclosure.

Referring to FIG. 3, a Hadoop configuration manager may transmit a Hadoop cluster generation request to an instance manager in step S320 when the Hadoop configuration manager receives a Hadoop cluster generation request from a user in step S310.

In response to the Hadoop cluster generation request, in order to be assigned with a resource for implementing a Hadoop system, the instance manager may transmit a resource assignment request to a resource manager in step S330.

In response to the resource assignment request, the resource manager checks a physical resource operated by the cloud system, and assigns a resource as much as CPU, memory, and disk amounts requested by the instance manager. After assigning the resource, the resource manager transmits a reply message of the resource assignment to the instance manager in step S340.

In response to the reply message of the resource assignment, the instance manager may send a request to a template manager for a Hadoop template for installing a Hadoop in a corresponding instance in step S350.

Then, the template manager may assign the Hadoop template of the instance request, and transmit a reply message that the Hadoop template has been assigned to the instance manager in step S360. Herein, the Hadoop template has a state in which general operating environment setting for the Hadoop and for an operation thereof has been completed.

In response to the reply message of the assignment, the instance manager generates a virtual machine in which a Hadoop system is operated in the computing resource received from the resource manager based on the template received from the template manager, and transmits a message that the instance generation has been completed to a Hadoop configuration manager in step S370.

In response to the message that the instance generation has been completed, the Hadoop configuration manager generates a number of Hadoop instances equal to a number of Hadoop clusters requested by the user, and send a request for Hadoop cluster environment setting to the instance manager in step S380.

Accordingly, in order to configure the Hadoop cluster, the instance manager may generate the Hadoop cluster by setting a network environment and sharing a SSH key, and transmit a reply message that the Hadoop cluster generation has been completed to the Hadoop configuration manager in step S390.

Figure 4:
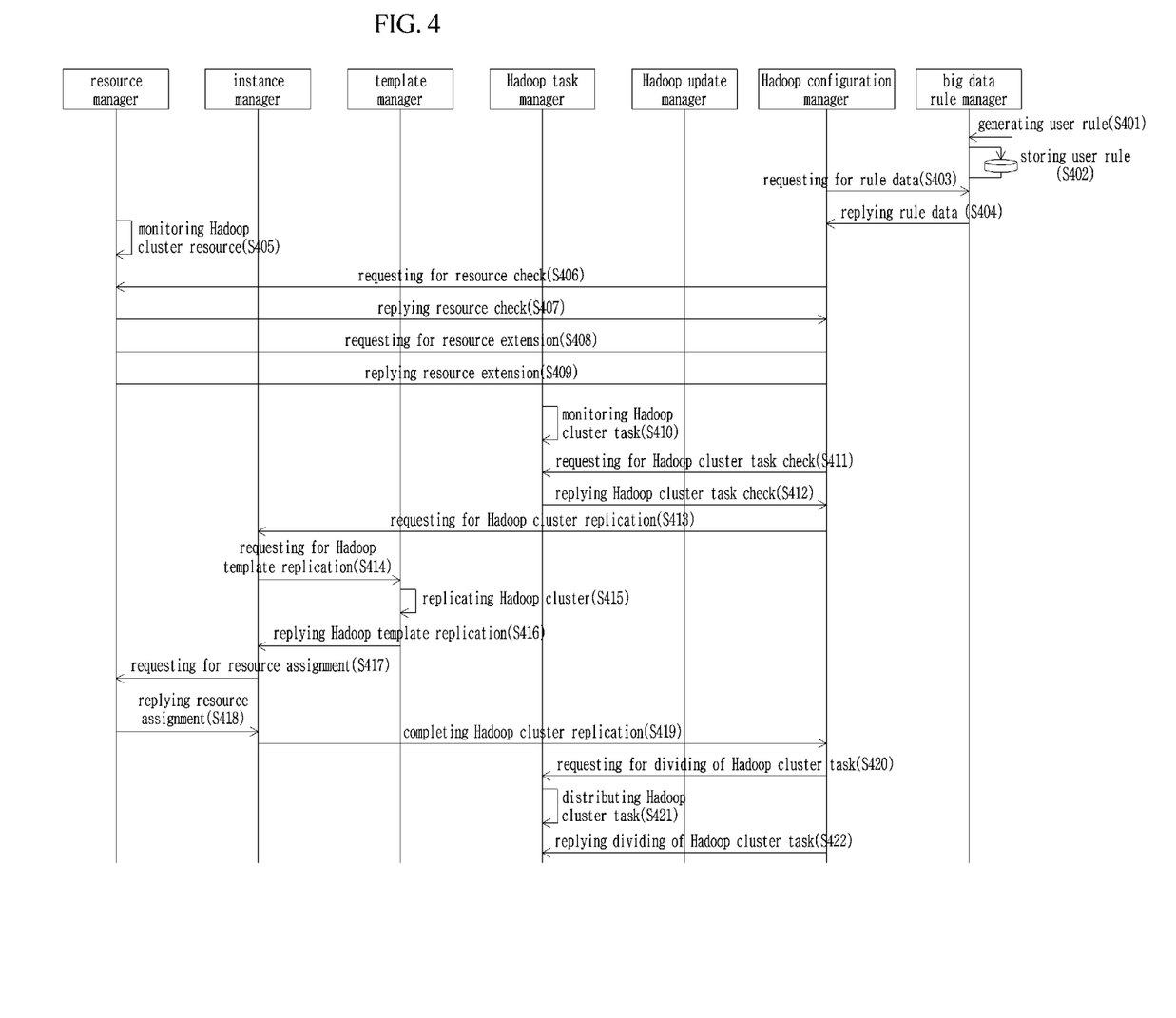
FIG. 4 is a view showing processes of adding a Hadoop cluster resource and replicating a Hadoop cluster within the cloud system according to the embodiment of the present disclosure.

FIG. 4 is a view showing processes of adding a Hadoop cluster resource and replicating a Hadoop cluster within the cloud system according to the embodiment of the present disclosure.

Referring to FIG. 4, a big data rule manager may store a user rule (or Hadoop cluster rule) received from a user in steps S401 and S402.

Then, a Hadoop configuration manager may send a request for rule data to the big data rule manager in step S403, and receive the user rule from the big data rule manager in step S404.

Meanwhile, a resource manager may continuously monitor a resource of a Hadoop cluster in step S405.

Then, in order to check a resource usage amount of the Hadoop cluster, the Hadoop configuration manager may transmit a message requesting for a resource check to the resource manager in step S406.

In response to the message requesting for the resource check, the resource manager may transmit a reply message of the resource used in the Hadoop cluster to the Hadoop configuration manager in step S407.

In response to the reply message of the resource usage, the Hadoop configuration manager may compare the using resource with the user rule, and transmit a resource extension request to the resource manager when the using resource exceeds a threshold value in step S408.

In response to the resource extension request message, the resource manager may check whether or not a resources is available as many as a requested resource amount, and if so, additionally assign the resource to the Hadoop cluster and transmit an extension message that the resource has been extended to the Hadoop configuration manager in step S409.

The cloud system may add a resource to a Hadoop cluster by using the above steps S401 to S409.

Meanwhile, the Hadoop task manager may continuously monitor a task assigned to the Hadoop in step S410.

Then, in order to check a task state of the Hadoop, the Hadoop configuration manager may transmit a message requesting for a check of a Hadoop cluster task to the Hadoop task manager in step S411.

In response to the message for requesting the check of the Hadoop cluster task, the Hadoop task manager may transmit a reply message of a current Hadoop task amount to the Hadoop configuration manager in step S412.

In response to the reply message of the Hadoop task amount, the Hadoop configuration manager may send a request for a Hadoop cluster replication to the instance manager when the current Hadoop task amount exceeds a threshold value of a user rule in step S413.

In response to the Hadoop cluster replication request, the instance manager may send a request for a currently operating Hadoop template replication to a template manager in step S414.

In response to the current operating Hadoop template replication request, the template manager may replicate the template of the currently operating Hadoop in step S415, and transmit a reply message of the replication request after providing the replicated template in step S416.

In response to the reply message of the replication request, the instance manager may transmit a request message for a resource assignment required for the replication to the resource manager in step S417, and receive the resource assignment from the resource manager in step S418.

Then, the instance manager may replicate the Hadoop cluster based on the template replicated in the assigned resource, and transmit a completion message of the Hadoop cluster replication to the configuration manager in step S419.

In response to the completion message of the Hadoop cluster replication, in order to divide a task of the Hadoop cluster in the replicated instance, the Hadoop configuration manager may transmit a task dividing request message to the Hadoop task manager in step S420.

In response to the task dividing request message, the Hadoop task manager may divide the task, and distribute the divided task to the replicated Hadoop cluster in step S421.

Then, the Hadoop task manager may transmit a reply message that the task has been distributed to the Hadoop configuration manager in step S422.

The cloud system may replicate a Hadoop cluster by using the above steps S410 to S422.

Figure 5:
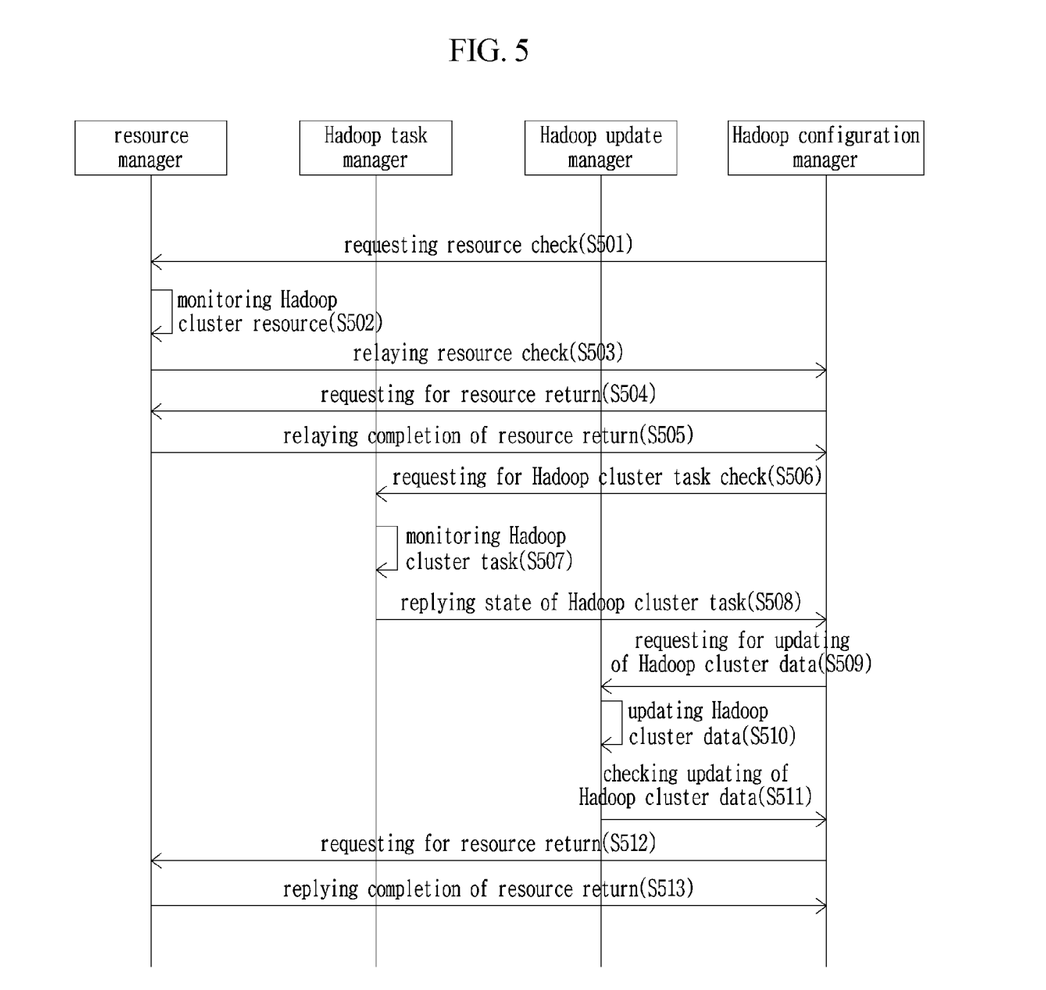
FIG. 5 is a view showing a process of returning an added Hadoop cluster resource and a replicated Hadoop cluster within the cloud system according to the embodiment of the present disclosure.

FIG. 5 is a view showing a process of returning an added Hadoop cluster resource and a replicated Hadoop cluster within the cloud system according to the embodiment of the present disclosure.

Referring to FIG. 5, a Hadoop configuration manager may transmit a resource check request message a resource manager in step S501.

In response to the resource check request message, the resource manager may monitor a Hadoop cluster resource in step S502, and transmit a resource usage check reply message of the Hadoop cluster in step S503.

In response to the resource usage check reply message of the Hadoop cluster, the Hadoop configuration manager may transmit a resource return request message to the resource manager in step S504 when a currently using resource exceeds a preset threshold value by comparing a user rule with the currently using resource.

In response to the resource return request message, the resource manager may return an assigned resource, and transmit a resource return completion reply message that the resource return has been completed to the Hadoop configuration manager in step S505.

The cloud system may return an added Hadoop cluster resource by using the above steps S501 to S505.

Meanwhile, the Hadoop configuration manager may transmit a Hadoop cluster task check request message to a Hadoop task manager in step S506.

In response to the Hadoop cluster task check request message, the Hadoop task manager may monitor a task of the Hadoop cluster in step S507, and report a task state to a Hadoop update manager in step S508.

Then, the Hadoop configuration manager may send an update request to the Hadoop update manager when a task amount is smaller than a threshold value in step S509.

In response to the update, in order to prevent data loss of the replicated Hadoop cluster before returning the resource, the Hadoop update manager may update date of the replicated Hadoop cluster to an existing Hadoop cluster in step S510.

Then, the Hadoop update manager may transmit a completion message of the Hadoop cluster data update to the Hadoop configuration manager in step S511.

In response to the completion message of the Hadoop cluster data update, the Hadoop configuration manager may transmit a resource return request message to the resource manager in step S512.

In response to the resource return request message, the resource manager may return the assigned resource, and transmit a resource return completion reply message to the Hadoop configuration manager in step S513.

The cloud system may return a replicated Hadoop cluster by using the above steps S506 to S513.

Flowcharts of FIG. 6 to FIG. 9 below will be described assuming that the flowcharts are performed by the cloud system 100 of FIG. 1.

Figure 6:
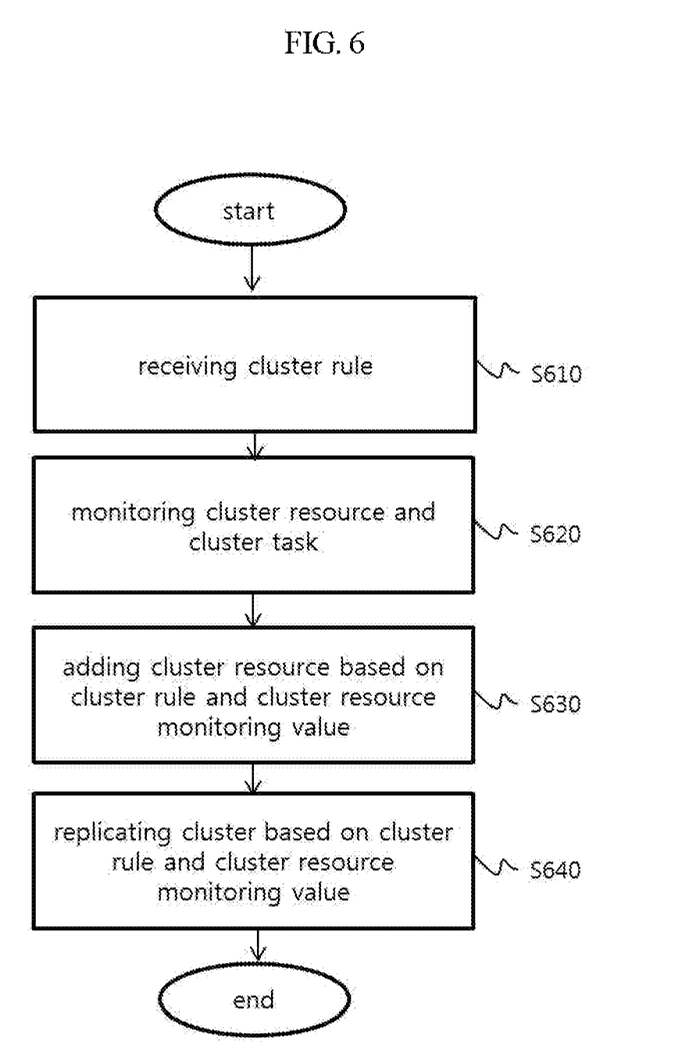
FIG. 6 is a flowchart showing an operation method of the cloud system according to the embodiment of the present disclosure.

FIG. 6 is a flowchart showing an operation method of the cloud system according to the embodiment of the present disclosure.

Referring to FIG. 6, the cloud system may receive a cluster rule in step S610.

Herein, the cluster rule may include at least one or a resource assignment threshold value, a resource amount to be assigned, a task threshold value, a number of clusters to be replicated, a resource returning threshold value, and a task returning threshold value.

Meanwhile, the cloud system may receive a pre-stored Hadoop cluster rule from at least one of an external storage device and an internal storage device, or may receive the cluster rule through an input device.

Then, the cloud system may monitor a cluster resource and a cluster task in step S620.

After step S620, the cloud system may add a cluster resource based on the cluster rule and a cluster resource monitoring value in step S630. In detail, the cloud system may add as many cluster resources as a resource amount to be assigned when the cluster task monitoring value is equal to or greater than a resource assignment threshold value.

Then, the cloud system may replicate the cluster based on the cluster rule and the cluster task monitoring value in step S640.

Steps S630 and S640 may be sequentially performed, or may be performed simultaneously or in an inverse sequence.

Meanwhile, the cluster may be a Hadoop cluster of an IaaS (Infrastructure as a Service) cloud system.

Figure 7:
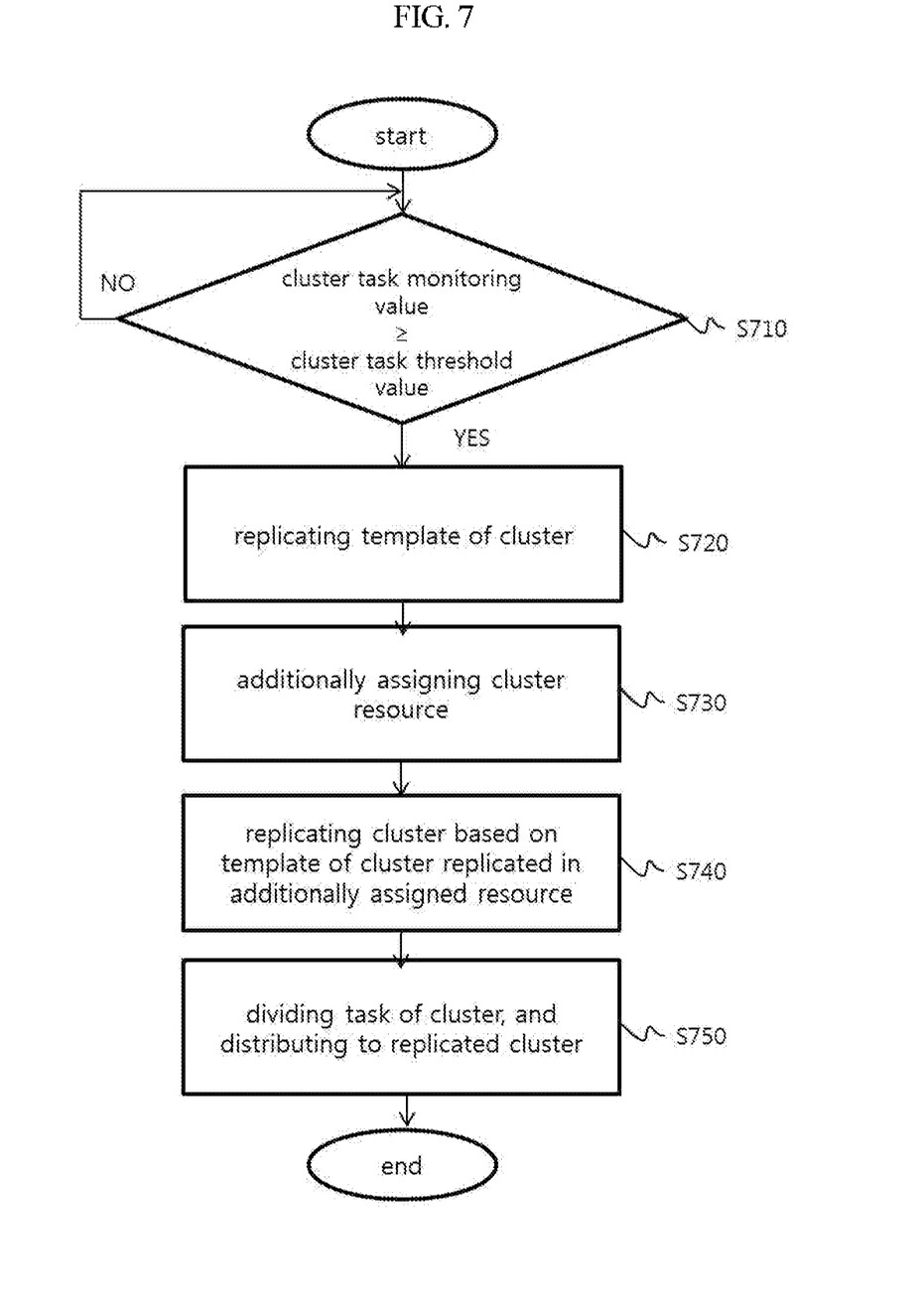
FIG. 7 is a flowchart showing a method of replicating a Hadoop cluster of the cloud system according to the embodiment of the present disclosure.

FIG. 7 is a flowchart showing a method of replicating the Hadoop cluster of the cloud system according to the embodiment of the present disclosure. FIG. 7 may correspond to step S640 of FIG. 6.

Referring to FIG. 7, the cloud system may determine a cluster replication when a cluster task monitoring value is equal to or greater than a task threshold value as step S710—YES.

When the cluster replication is determined, the cloud system may replicate a template of the cluster in step S720.

Then, the cloud system may additionally assign a cluster resource in step S730.

After step S730, the cloud system may replicate the cluster equal to a number of clusters to be replicated in the additionally assigned resource based on the template of the replicated cluster in step S740.

After step S740, the cloud system may divide a cluster task, and distribute the divided task to the replicated cluster in step S750.

Figure 8:
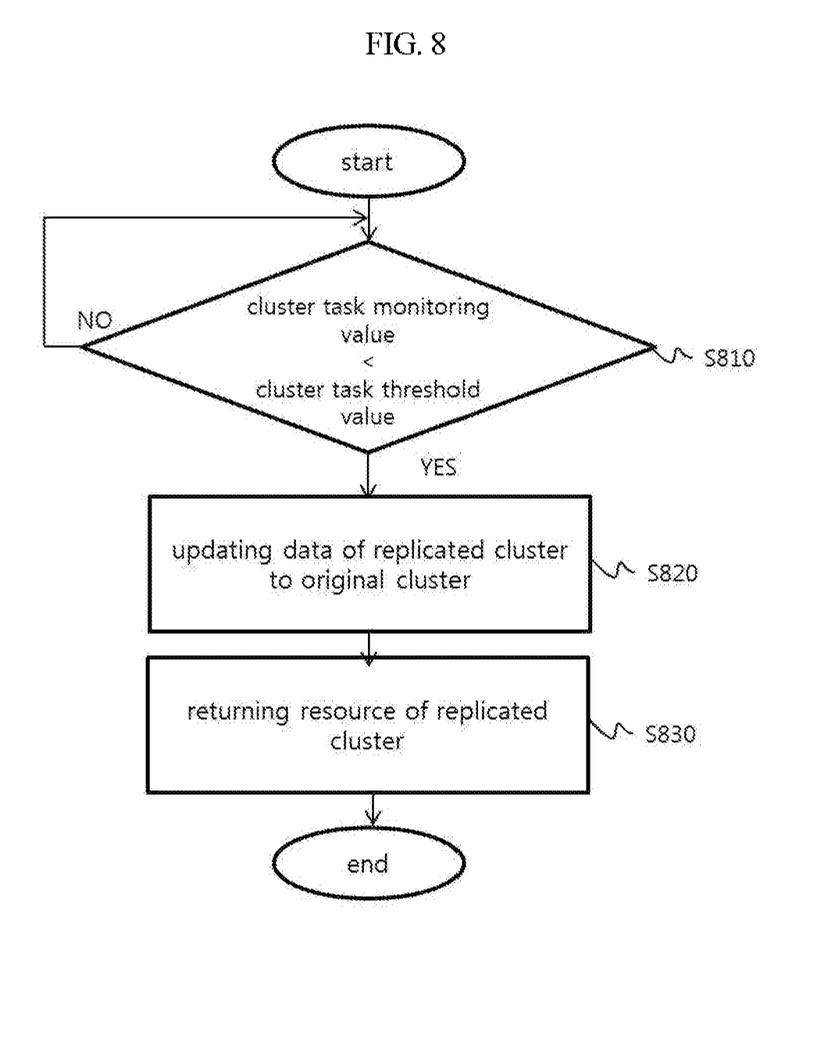
FIG. 8 is a flowchart showing a method of returning a replicated Hadoop cluster of the cloud system according to the embodiment of the present disclosure.

FIG. 8 is a flowchart showing a method of returning a replicated Hadoop cluster of the cloud system according to the embodiment of the present disclosure.

Referring to FIG. 8, the cloud system may determine a return of a replicated cluster when a Hadoop cluster task monitoring value is smaller than a task returning threshold value as step S810—YES.

When the return of the replicated cluster is determined, the cloud system may update data of the replicated cluster to an original cluster in step S820.

Then, the cloud system may return a resource of the replicated cluster in step S830.

Figure 9:
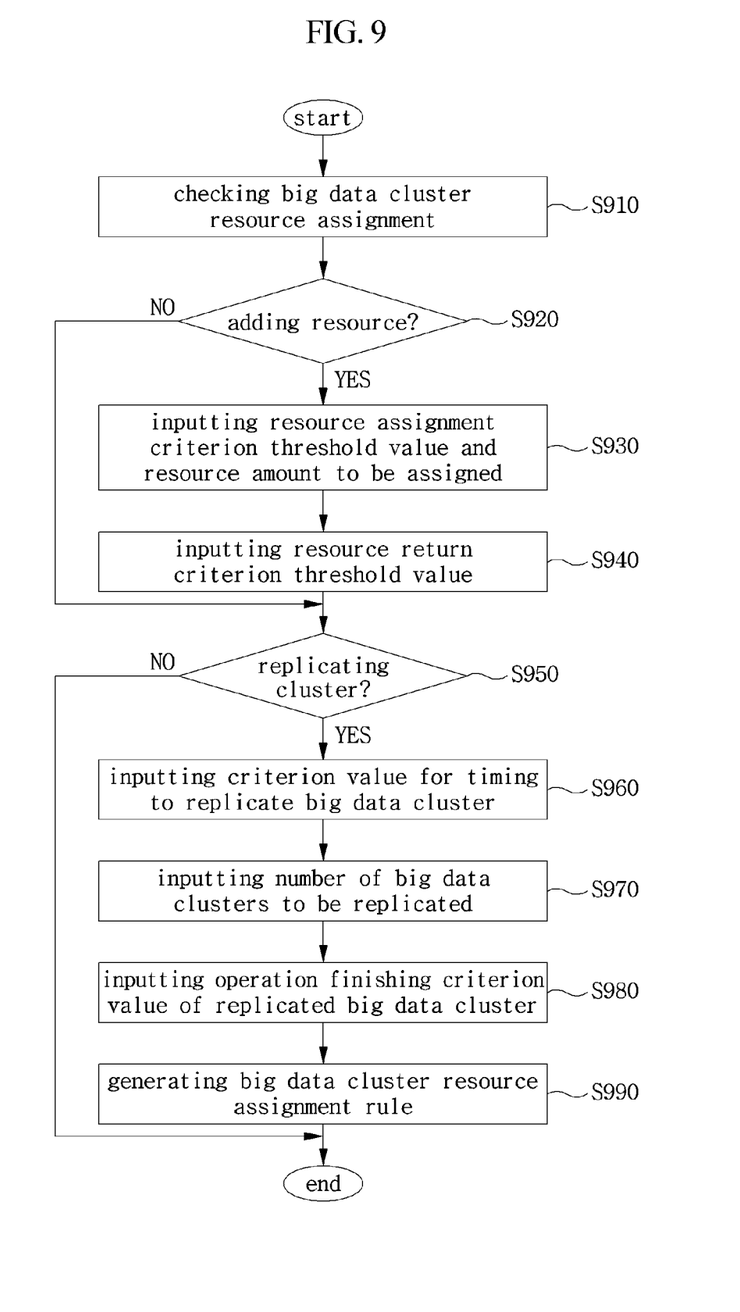
FIG. 9 is a flowchart showing a method of generating a Hadoop cluster rule of the cloud system according to the embodiment of the present disclosure.

FIG. 9 is a flowchart showing a method of generating a Hadoop cluster rule of the cloud system according to the embodiment of the present disclosure.

Referring to FIG. 9, the cloud system may output an assigned state of a big data cluster resource (or resource) so that a user may check the assigned state in step S910.

The cloud system may receive an input whether or not to add a resource to the cloud system from the user in step S920.

When there is not input of adding the resource from the user as step S920—NO, step S950 may be performed.

However, when there is an input of adding the resource as step S920—YES, a resource assignment criterion threshold value and an assignment amount may be input from the user in step S930. For example, when a CPU usage of a currently assigned Hadoop cluster is equal to or greater than 80%, a criterion threshold value for assigning at least two CPU cores may be input. Herein, an 80% of a CPU usage amount is a resource assignment criterion threshold value, and two CPU cores mean a resource amount to be assigned.

Meanwhile, the resource assignment criterion threshold value and the resource amount to be assigned of step S930 may respectively correspond to a resource assignment threshold value and a resource amount to be assigned.

Then, the cloud system may receive an input of a resource return criterion threshold value for the additionally assigned resource in step S940. For example, the resource return criterion threshold value may be received by inputting a threshold value criterion so that two additionally assigned CPU cores are returned when a CPU usage amount is less than 20%. Herein, a 20% of a CPU usage amount means a resource return criterion threshold value.

Meanwhile, the resource return criterion threshold value of step S940 may correspond to a resource returning threshold value.

Then, the cloud system may receive an input from the user whether or not to replicate the cluster of the cloud system in step S950.

When there is an input for a cluster replication as step S950—YES, the cloud system may receive an input of a criterion value for a timing to replicate the cluster from the user in step S960. For example, when a task amount managed in a Hadoop task manager exceeds one hundred, the cloud system may perform the cluster replication. A hundred of task amount may be a criterion value for the timing to replicate the cluster.

Meanwhile, the criterion value for the timing to replicate the cluster of step S960 may correspond to a task threshold value.

Then, the cloud system may receive an input from the user a number of big data clusters to be replicated in step S970.

Then, the cloud system may receive an input from the user an operation finishing criterion value of the replicated big data cluster in step S980. For example, when an accumulated task amount is less than 10, the cloud system may finish the operation of the replicated big data cluster.

Meanwhile, the operation finishing criterion value of the replicated big data cluster of step S980 may correspond to a task returning threshold value.

Then, the cloud system may generate a big data cluster resource assignment rule (or Hadoop cluster rule) including a resource assignment criterion threshold value, a resource amount to be assigned, a resource return criterion threshold value, a criterion value for a timing to replicate a cluster, a number of big data clusters to be replicated, and an operation finishing criterion value of a replicated big data cluster which are input from the user in step S990.

Operation method of the cloud system of FIG. 6 to FIG. 9 may be performed by an apparatus included in another cloud system, server, etc.

Meanwhile, software or a computer-readable medium including executable instructions for implanting the operation method of the cloud system according to one aspect of the present disclosure may be provided. The executable instructions may include: receiving a cluster rule; monitoring a cluster resource and a cluster task; adding a cluster resource based on the cluster rule and the cluster resource monitoring value; and replicating a cluster based on the cluster rule and the cluster task monitoring value.

The present disclosure relates to an operation technique of a cloud system, and big data processing speed may be continuously maintained by adding a cluster resource and replicating a Hadoop cluster for processing big data in the cloud system, thus high availability may be easily provided.

In addition, according to the present disclosure, when an error occurs in an original big data system, a big data processing may be continuously provided by a Hadoop cluster replication. In addition, a big data system may be continuously used regardless with a version change thereof since the big data system is operated by using a cloud system without changing functions of the big data system.

The method shown in the present disclosure is described as a series of operations for clarity of description, and the order of steps is not limited. When needed, the steps may be performed at the same time or in a different order. In order to implement the method according to the present disclosure, the steps may additionally include other steps, include the remaining steps except for some steps, or may include additional steps.

The various embodiments of the disclosure are not intended to be exhaustive of all possible combinations and are intended to illustrate representative aspects of the disclosure. The matters described in the various embodiments may be applied independently or in a combination of two or more.

In addition, the embodiments of the present disclosure may be implemented by various means, for example, hardware, firmware, software, or a combination thereof. In a hardware implementation, an embodiment of the present disclosure may be implemented by one or more ASICs (Application Specific Integrated Circuits), digital signal processors (DSPs), digital signal processing devices (DSPDs), programmable logic devices (PLDs), field programmable gate arrays (FPGAs), processors, controllers, microcontrollers, microprocessors, etc.

The scope of the present disclosure includes software or machine-executable instructions (for example, an operating system, applications, firmware, programs, etc.) that enable operations the methods according to the various embodiments to be performed on a device or computer, and a non-transitory computer-readable medium in which such software or instructions are stored and are executable on a device or computer.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cloud operating method of processing big data with a cloud system, the cloud operating method comprising:
receiving, with the cloud system, a cluster rule;
monitoring, with the cloud system, a cluster resource and a cluster task;
adding, with the cloud system, another cluster resource based on the cluster rule and a cluster resource monitoring value; and
replicating, with the cloud system, a cluster based on the cluster rule and a cluster task monitoring value,
wherein the cluster rule includes at least one of a resource assignment threshold value, a resource amount to be assigned, a task threshold value, and a number of replicated clusters, and
wherein the replicating of the cluster includes:
determining a cluster replication when the cluster task monitoring value is equal to or greater than the task threshold value;
replicating a template of the cluster;
additionally assigning a cluster resource;
replicating the cluster by the number of replicated clusters based on the replicated template of the cluster in the additionally assigned resource; and
dividing a task of the cluster and distributing the divided task to the replicated cluster.

2. The cloud operating method of claim 1, wherein in the receiving of the cluster rule, a pre-stored cluster rule is received from at least one of an external storage device and an internal storage device, or the cluster rule is received through an input device.

3. The cloud operating method of claim 1, wherein in the adding of the cluster resource, as many cluster resources as the resource amount to be assigned is added when the cluster task monitoring value is equal to or greater than the resource assignment threshold value.

4. The cloud operating method of claim 1, further comprising returning, with the cloud system, the added cluster resource based on the cluster rule and the cluster resource monitoring value.

5. The cloud operating method of claim 4, wherein:
the cluster rule further includes a resource returning threshold value, and
in the returning of the added cluster resource, the added cluster resource is returned when the cluster task monitoring value is smaller than the resource returning threshold value.

6. The cloud operating method of claim 1, further comprising returning, with the cloud system, the replicated cluster based on the cluster rule and the cluster task monitoring value.

7. The cloud operating method of claim 6, wherein:
the cluster rule includes a task returning threshold value, and
the returning of the replicated cluster includes:
determining a return of the replicated cluster when the cluster task monitoring value is smaller than the task returning threshold value;
updating data of the replicated cluster to an original cluster; and
returning a resource of the replicated cluster.

8. The cloud operating method of claim 1, wherein the cluster is a Hadoop cluster of an IaaS (Infrastructure as a Service) cloud system.

9. A cloud system for processing big data, the cloud system comprising:
at least one processor;
a memory having instructions stored thereon, which, when executed by the at least one processor, cause the at least one processor to function as:
a big data rule management module receiving and storing a cluster rule;
an instance management module generating a cluster;
a resource management module monitoring a cluster resource;
a cluster task management module monitoring a cluster task;
a cluster configuration management module sending a request for an additional cluster resource to the resource management module based on the cluster rule and a cluster resource monitoring value, and sending a request for a cluster replication to the instance management module based on the cluster rule and a cluster task monitoring value; and
a template management module replicating a template of the cluster, wherein:
the cluster rule includes at least one of a resource assignment threshold value, a resource amount to be assigned, a task threshold value, and a number of replicated clusters;
the cluster configuration management module determines a cluster replication when the cluster task monitoring value is equal to or greater than the task threshold value;
the instance management module sends a request for a template replication of the cluster to the template management module according to the cluster replication decision of the cluster configuration management module, sends a request for an additional resource assignment to the resource management module, and replicates the cluster by the number of replicated clusters based on the replicated template of the cluster in the additionally assigned resource; and
the cluster task management module divides a task of the cluster and distributes the divided task to the replicated cluster.

10. The cloud system of claim 9, wherein the big data rule management module receives a pre-stored cluster rule from at least one of an external storage device and an internal storage device, or receives the cluster rule through an input device.

11. The cloud system of claim 9, wherein the cluster configuration management module determines to add as many resources as the resource amount to be assigned when the cluster task monitoring value is equal to or greater than the resource assignment threshold value.

12. The cloud system of claim 9, wherein the cluster configuration management module determines a return of the added cluster resource based on the cluster rule and the cluster resource monitoring value.

13. The cloud system of claim 12, wherein:
the cluster rule further includes a resource returning threshold value, and
the cluster configuration management module determines the return of the added cluster resource when the cluster resource monitoring value is smaller than the resource returning threshold value.

14. The cloud system of claim 9, wherein the cluster configuration management module determines a return of the replicated cluster based on the cluster rule and the cluster task monitoring value.

15. The cloud system of claim 14,
wherein the cluster rule further includes a task returning threshold value, and the cluster configuration management module determines the return of the replicated cluster when the cluster task monitoring value is smaller than the task returning threshold value, and
wherein the memory further has instructions stored thereon, which, when executed by the at least one processor, cause the at least one processor to function as:
a cluster update management module updating data of the replicated cluster to an original cluster according to the replicated cluster returning decision of the cluster configuration management module, and
the resource management module returning the resource of the replicated cluster according to the replicated cluster returning decision of the cluster configuration management module.

16. The cloud system of claim 9, wherein the cluster is a Hadoop cluster of an IaaS (Infrastructure as a Service) cloud system.

* * * * *